Figure 1:
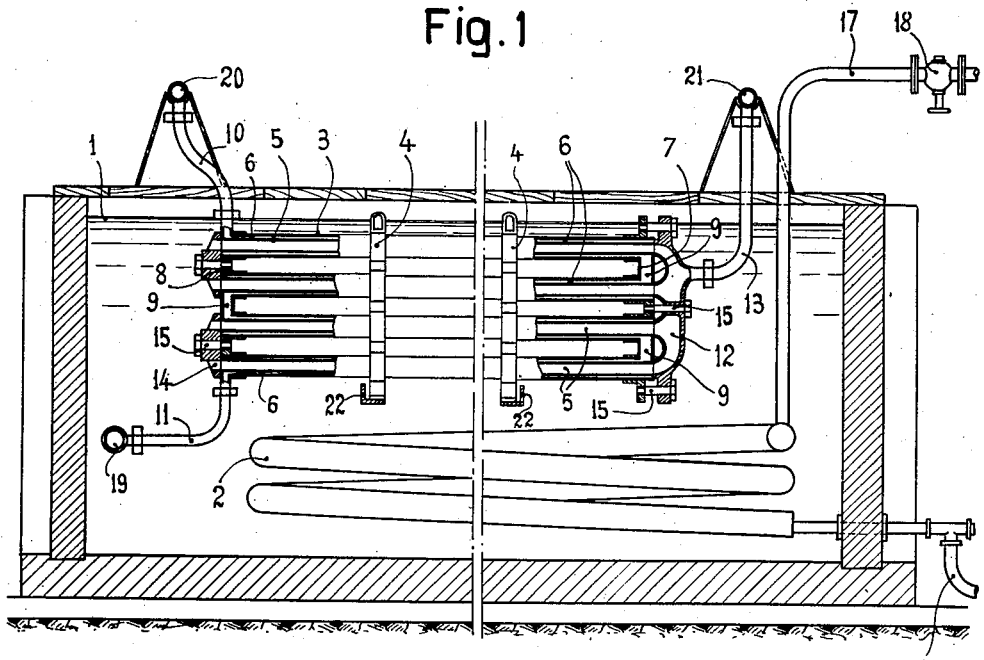

Jan. 27, 1931.   H. STASSANO   1,790,117
METHOD FOR STERILIZING AND PASTEURIZING LIQUIDS
Filed June 26, 1926

Inventor:
H. Stassano
By
Langner, Perry, Card & Langner
Attys.

Patented Jan. 27, 1931

1,790,117

UNITED STATES PATENT OFFICE

HENRI STASSANO, OF STRASBOURG, FRANCE

METHOD FOR STERILIZING AND PASTEURIZING LIQUIDS

Application filed June 26, 1926, Serial No. 118,831, and in France July 1, 1925.

The method to be described relates to the pasteurization and sterilization of putrefiable liquids, such as milk, beer and the like.

It is known that methods at present used for this purpose do not give satisfactory results, because they do not induce a safe and permanent sterilization or, at least, a pasteurization; on the other hand they affect the heat-sensitive components which make for the alimentary value of the treated liquids, when they do effect real sterilization. Milk, for example, is more or less highly affected in the latter relation for it is exceedingly sensitive to heat.

Where the term "preserving" is used hereinafter it is intended that the liquid be both pasteurized and sterilized or at least pasteurized and perhaps partly sterilized.

The following apparatus is useful both for the complete sterilization of organic liquids and also for their pasteurization. Moreover it is practical and can be applied in a satisfactory manner to commercial ends. It prevents the treated liquids from being injured by heat and does not disturb their gas content. By the treatment with the present invention calcium salts and phosphates present in milk are maintained in soluble and assimilable forms and it is possible to pasteurize beer without reducing its carbonic acid content, its particular taste, or its crystalline transparency.

These results are obtained by taking advantage of the fact, noted by applicant, that at a given temperature, micro-organisms are more powerfully and completely affected by heat, when heat is applied to them directly by means of a metal wall on which they are caused to impinge under capillary action. When compared with the usual method, in which heat is imparted by convection streams arising in a liquid heated through a wall and the organisms floating in the liquid, the advantages of this method are far superior. The applicant has found that it is not necessary to distribute the liquid in an exceedingly thin layer for obtaining the described result, for this operation makes the flow of liquid very slow and difficult, and it is therefore not commercially practicable. On the contrary it is sufficient to distribute the liquid in a layer which has only a comparatively slighter reduced thickness, say, that of a little less than one millimetre, provided that the extension of the heated path is a very high multiple of this thickness, about of the order of twenty-thousand, and the liquid flow is made with a velocity of about two metres per second.

Under the above conditions micro-organisms are at any time spaced at a distance not greater than 4 to 5 tenths of one millimetre apart from the metal wall surfaces, and they are attracted by this wall before the liquid has moved through its entire path. Then each of them, coming in contact with one of the walls, is thus subjected to the direct action of heat. The metal walls are maintained at a temperature of about 70–75° C. for effecting pasteurization, and of 120–135° C. for sterilization, that is, at a temperature which would be entirely insufficient to obtain the desired result in so short a time under the ordinary conditions.

The comparatively low temperature of the metal walls enclosing the path passed through by the liquid, and the velocity of the liquid as it moves through this path, prevent the material from being affected by heat. The applicant has found that the duration of the heating has a more pronounced action than the temperature itself in the effect of heat on albuminoid substances.

For carrying out the method according to the present invention advantageous use is made of an apparatus comprising concentric tubes with an intermediate space having the desired thickness and the whole held at an uniform temperature. The heat is obtained by means of a hot liquid bath or of a circulating fluid. To this end use may be made of apparatus of the type of heat exchangers. In this case it is not only required to keep the liquid at a given temperature for a comparatively short time (which, in any case, has a duration which may not be sensible to man) but also it is essential that the heat action on bacteria in the liquid is effective for the time necessary to kill them.

Figure 2:
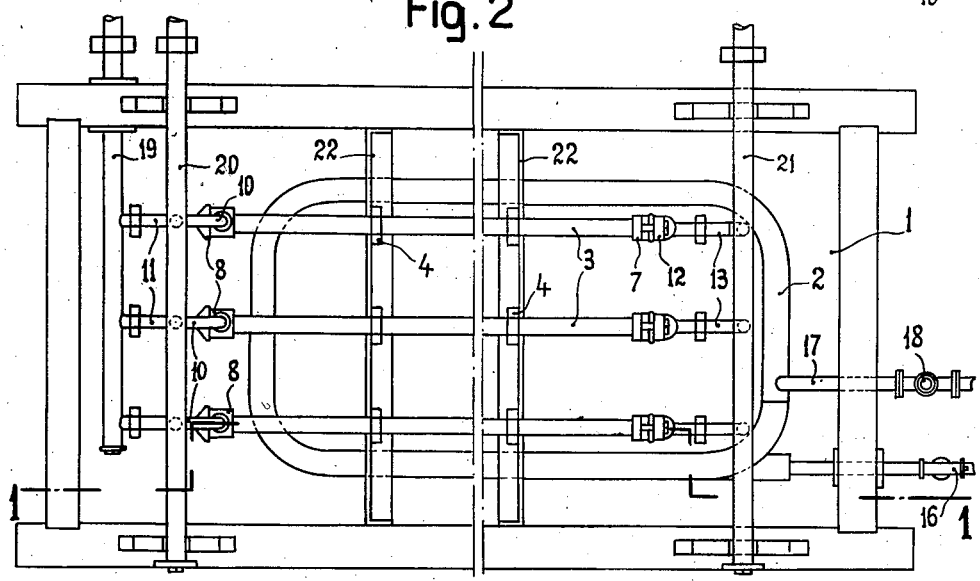

On the annexed drawing is shown by way of example a construction of apparatus for carrying out the method according to the present invention, and Figure 1 is a longitudinal vertical fragmentary section of said apparatus on line 1—1 of Figure 2; Figure 2 is a plan view.

Said apparatus comprises a container 1 filled with a liquid heated by a tubular coil 2 through which steam, for example, is caused to flow by means of a connection 17 having a valve 18 and an outlet connection 16.

The path through which the liquid under treatment flows is formed by tubes 3 carried by supports 4 and cross members 22 and arranged in vertical rows, the elements of each row being connected in series with respect to the liquid flow as hereinafter described, and having a length of about ten metres. A tube 5 is located within each tube 3 to form therewith an annular space 6 the thickness of which is from eight-tenths of a millimetre to one millimetre. One end of tubes 3 of each vertical row opens in a header 7 which provides passages 9 for alternate intercommunication of spaces 6 of adjacent pairs of tubes 3—5 of the row. The opposite end of the tubes 3 opens in another header 8 which provides a similar passage 9 connecting the spaces 6 of the intermediate pairs of tubes, said passage 9 of header 8 alternating with passages 9 of header 7. Each header 8 has a union 10 in communication with the space 6 between the top pair of tubes 3—5 and an union 11 in communication with the space 6 of the lowest tube pair, said unions leading to mains 20 and 19 respectively.

Header 8 has orifices 14 each in front of the bore of one of internal tubes 5, and a manifold 12 is fastened on header 7 by means of bolts 15, said manifold receiving the outlets of tubes 5 and having a union 13 for connection with a main 21.

The liquid to be treated flows in through main 20 and is directed through unions 10 to the top spaces 6 of the several headers 8; then it flows along space 6 between top tubes 3—5, to space 9 of header 7, space 6 of the second pair of tubes, space 9 of header 8 and so on until it reaches in each row the union 11 and is discharged to outlet main 19.

The liquid in the container 1, which is heated by the circulation of steam through coil 2, is circulated by a pump (not shown) through orifices 14 of header 8, bores of tubes 5, manifold 12, union 13 and main 21, and at the same time said liquid encircles the outer tubes 3 thus providing an uniform heating of tubes 3—5 and of the content of their intermediate space 6.

For this process it is not sufficient that the surfaces of the liquid path provided by tubes 3—5 consist of good-heat conducting metal; on the contrary the best results are secured only when a metal is used which is a good heat conductor and at the same time has a very little heat capacity. By way of example, aluminium is not proper for tubes of an apparatus intended to carry out the present process, but there is advantage in using copper for providing tubes 3—5 because copper has a high heat conductivity and a comparatively low heat capacity.

By using copper tubes to provide the lining of the space intended for the liquid path, the maximum action of wall surfaces on the microbes is available, and it is then possible to obtain the desired result with a low temperature in a very short time.

With an apparatus of this type in which the path of the liquid flow has a thickness of about 8/10 millimetre and a length of at least 10 metres and a velocity of about two metres per second, milk is completely pasteurized within about 8–11 seconds at a temperature of 70–75° C. without any of its other characters being affected.

The method according to the present invention provides also for sterilizing milk. The milk can then be preserved in a highly satisfactory manner.

What I claim as my invention and desire to secure by United States Letters Patent is:—

1. A method for preserving putrefiable liquids, comprising flowing the liquid in but a few seconds in the form of a substantially uniform layer approximately 0.8 to a millimeter thick through a long path, confining the layer between two metal plate surfaces, and maintaining the said metal plate surfaces at a substantially uniform temperature of approximately 70–75° C. throughout substantially the entire extent of the said surfaces.

2. A method for preserving putrefiable liquids, comprising flowing the liquid in approximately 8–11 seconds in the form of a substantially uniform layer approximately 0.8 to a millimeter thick through a long path at a velocity of approximately two meters per second, confining the layer between two metal surfaces formed of material of low specific heat, and maintaining the said metal plate surfaces at a substantially uniform temperature of approximately 70–75° C.

3. A method of preserving putrefiable liquids, comprising flowing the liquid at high velocity in the form of a substantially uniform layer approximately one millimeter thick along a long path, confining the said layer between two concentric metal tubes, maintaining the said metal tubes at substantially 70–75° C. throughout substantially their entire extent, and timing the flow of liquid through the annular space thus defined, so that the liquid will flow completely therethrough in but a few seconds, whereby to substantially completely debacteriaize the liquid in a short time interval.

4. A process of preserving putrefiable liquids, comprising flowing the liquid at a velocity of approximately 1.5 to 2.0 meters per second along a long path, the said layer being in the form of an annulus, approximately one millimeter thick, confining the layer between concentric metal tubes formed of metal of low specific heat, maintaining the concentric tubes at approximately 70–75° C. throughout approximately their entire extent, and flowing the liquid completely through the said path in but a few seconds, whereby the said liquid is substantially completely debacteriaized in a short time interval.

In testimony whereof I have signed my name to this specification.

HENRI STASSANO.